United States Patent Office 2,853,486
Patented Sept. 23, 1958

2,853,486

21-AZIDO STEROIDS OF THE PREGNANE SERIES AND PROCESS FOR PREPARING SAME

Lewis H. Sarett, Princeton, Horace D. Brown, Plainfield, and Alexander R. Matzuk, Colonia, N. J., assignors to Merck & Co., Inc., Rahway, N. J., a corporation of New Jersey No Drawing. Application February 16, 1956
Serial No. 565,767

24 Claims. (Cl. 260—239.5)

This invention relates to compounds having a cyclopentanopolyphenanthrene nucleus and particularly to such compounds having an azido group attached to the 21-carbon atom, and to processes for preparing these compounds.

The compounds which are the subject of the invention are compounds having the following general formula:

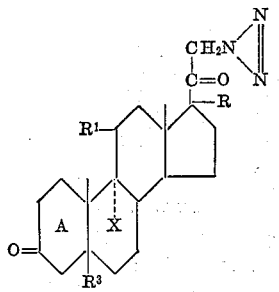

wherein X is hydrogen, fluoro, chloro or bromo group; R is hydrogen or a hydroxy and $R^1$ is a keto group (O=) or a hydroxy group, $R^3$ is a hydrogen group in the α or β configuration; and derivatives thereof wherein the A ring is unsaturated. The allopregnanes and unsaturated pregnanes have cortisone-like activity and, therefore, can be compounded and used in a manner similar to cortisone. The pregnanes can be readily converted to an active compound by the institution of a double bond such as by fermenting with a strain of *Mycobacterium phlei*.

According to the invention the 21-azido compounds are prepared by reacting the corresponding 21-sulfonoxy compound with an alkali metal or alkaline earth metal azide. This reaction can be chemically illustrated, as an example, with a pregnane compound as follows:

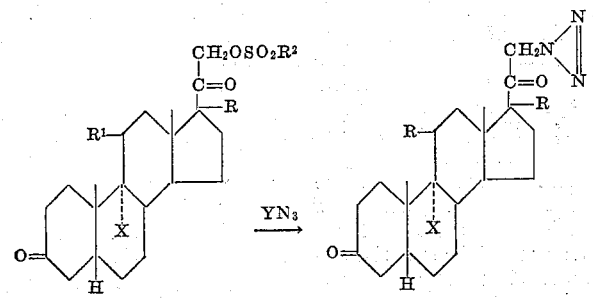

wherein $R^2$ is an alkyl group containing less than seven carbon atoms and Y is a metal group.

The reaction of the 21-sulfonoxy compound with the alkali metal or alkaline earth metal azide is preferably carried out in a solvent. Typical examples of suitable azides are sodium azide, potassium azide, calcium azide, lithium azide, magnesium azide and barium azide. Some of the solvents which can be used are lower alcohols, lower ketones and aromatic hydrocarbons. Examples of these solvents are methanol, ethanol, propanol, butanol, acetone, methyl ethyl ketone, diethyl ketone, ethyl propyl ketone, toluene, benzene, xylene and naphthalene. The preferred temperatures for effecting the reaction are room temperatures (20–40° C.) and above, although elevated temperatures such as the reflux temperature of the solvent mixture are the most convenient. The reaction is usually complete in from one to four hours when carried out at the preferred reaction temperature. The product can be recovered by filtering the reaction mixture and recrystallizing the product from a suitable solvent such as pyridine or the like, by the addition of an immiscible solvent such as water.

Typical of the compounds which can be produced are 11-oxygenated compounds having the formula:

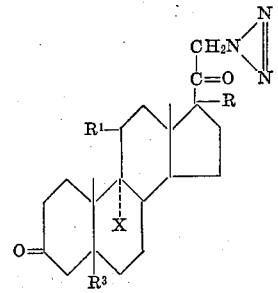

wherein the values are as follows:

TABLE I

| Unsaturated Between Carbon Atoms | R | $R^1$ | $R^3$ | X |
|---|---|---|---|---|
| — | OH | OH | βH | H |
| 4,5 | OH | OH | — | H |
| 4,5 | OH | OH | — | F |
| 4,5 | OH | OH | — | Cl |
| 1,2; 4,5 | OH | OH | — | H |
| 4,5 | OH | OH | — | F |
| 4,5 | OH | O= | — | H |
| 4,5 | H | O= | — | H |
| 4,5 | H | OH | — | H |
| — | OH | O= | β | H |
| — | OH | O= | αH | H |
| — | OH | O= | αH | F |
| 1,2; 4,5 | OH | O= | — | H |
| 1,2; 4,5 | OH | O= | — | F |
| 1,2 | OH | O= | — | F |
| 1,2; 4,5 | H | O= | — | H |

By the term 11-oxygenated is meant the presence of an 11-hydroxy group or an 11-keto group in the molecule.

The 21-sulfonoxy compound used as the starting material is prepared by reacting the corresponding 21-hydroxy compound with an organic sulfonyl chloride. The sulfonyl chloride is of the formula $R^2SO_2Cl$, wherein $R^2$ is an alkyl group preferably containing less than seven carbon atoms. Typical examples of such groups are methyl, ethyl, propyl, isopropyl, butyl, heptyl, pentyl and the like. The reaction is preferably carried out in a solvent such as pyridine or another tertiary amine. The reaction is usually complete in about one to three hours when the temperature is maintained at approximately 0° C. The product is recovered by diluting the reaction mixture with water and recovering the crystalline mater'

A typical method of using the 21-azido compounds prepared in accordance with the invention is in a dermatologic vehicle for topical application to combat afflictions such as various types of poison ivy, poison oak and the like. Such dermatological vehicles can be of the oil-in-water type. The particle size of the 21-azido compound is desirably less than 100 microns and preferably less than 35 microns. Desirable results are obtained with a particle size of 10 to 15 microns. The concentration of the 21-azido compound can be varied within wider limits, but it is preferably in an amount ranging from about 0.1% to about 25% by weight of the composition depending on the particular use intended. Vehicles containing from about 1% to about 5% of the active ingredient have been found to be particularly satisfactory. A typical lotion can be prepared by suspending the 21-azido compound in an aqueous vehicle comprising glycerol, alcohol and soap.

The following examples are given for the purposes of illustration:

*Example 1.—21-azido-4-pregnene-17α-ol-3,11,20-trione*

A 0.5 gram sample of 21-mesylate-4-pregnene-17α-ol-3,11,20-trione and 0.12 gram of sodium azide were dissolved in 10 ml. acetone and heated at the reflux temperature of the mixture for two hours. The reaction product was filtered and the solid material washed with water, acetone and chloroform. The product was further purified by dissolving in hot pyridine and adding methanol followed by cooling and filtering. The filtered product was dried in vacuo. Melting point 294–296° C. (dec.) λ Maximum 2380, E% 413 in methanol. I. R. shows azide 4.8 $\mu$, 20-carbonyl at 5.82 $\mu$, 11-carbonyl at 5.90 $\mu$, hydroxyl at 2.82 $\mu$, and conjugate carbonyl at 6.02 $\mu$ and 6.17 $\mu$. Calculated: C, 65.43; H, 7.06; N, 10.90. Found: C, 65.84, 65.65; H, 7.46, 7.34; N, 10.69.

The compounds were shown to have activity in the liver glycogen test and anti-inflammatory and local cortisone-like activity.

*Example 2.—21-azido-4-pregnene-11β,17α-diol-3,20-dione*

A 0.5 gram sample of 21-mesylate-4-pregnene-11β,17α-diol-3,20-dione and 0.11 gram of sodium azide were dissolved in 10 ml. acetone and heated at the reflux temperature of the mixture for two hours. The reaction mixture was concentrated to dryness and the residue washed with water, acetone and chloroform. The solid material was then dissolved in a minimum amount of hot pyridine, some methanol added, and then a large excess of water. The resulting mixture was cooled, filtered and the filtrate dried in vacuo. Melting point on starting at 220° C. melts 228–234° C. (dec.) λ Maximum 2420, E% 416 in methanol. I. R. in solid state shows OH at 3.0 $\mu$, azide at 4.82 $\mu$, C=O at 5.82 $\mu$, and conjugate carbonyl at 6.1 and 6.19 $\mu$. Calculated: C, 65.09; H, 7.54; N, 10.85. Found: C, 65.35; H, 7.77; N, 10.22, 10.90. The product had cortisone-like activity.

*Example 3.—21-azido-1,4-pregnadiene-17α-ol-3,11,20-trione*

A sample of 0.218 gram of 21-mesylate-1,4-pregnadiene-17α-ol-3,11,20-trione and 40 mg. of sodium azide were dissolved in 25 ml. of acetone. The resulting solution was heated at the reflux temperature of the mixture for 1.5 hours. A flocculent precipitate which formed was separated by centrifugation and the solution concentrated to 2 ml. in a stream of dry nitrogen gas at 25° C. The product was diluted with an equal volume of water and a yellow crystalline solid was formed which softened at 260–275° C. and decomposed at 285–310° C. Recrystallization from 3:2 methanol-pyridine mixture gave a colorless product decomposing at 285–300° C. Analysis calculated for $C_{21}H_{25}O_4N_3$ (383.43): C, 65.78; H, 6.57. Found: C, 66.23; H, 6.75. U. V. in concentrate $H_2SO_4$ (two hours). λ Maximum 2600 (E% 405); 2990 (E% 193). The product showed cortisone-like activity in the liver glycogen test.

*Example 4.—21-azido-1,4-pregnadiene-11β,17α-diol-3,20-dione*

A 650 mg. sample of 21-mesylate-1,4-pregnadiene-11β, 17α-diol-3,20-dione and 500 mg. of sodium azide were dissolved in 25 ml. of acetone. The mixture was heated at reflux with stirring for approximately three hours. The solution was cooled in ice and then slowly poured with vigorous stirring in 200 ml. of water. The product decomposed at 220–230° C. Upon recrystallization from acetone-water the product decomposed at 225–230° C. Analysis calculated for $C_{21}H_{27}O_4N_3$ (385.45): N, 10.90. Found: N, 10.76.

*Example 5*

A lotion of 21-azido-1,4-pregnadiene-17α-ol-3,11,20-trione containing the following ingredients was prepared as described below:

|  | Gram |
|---|---|
| 21-azido-1,4-pregnadiene-17α-ol-3,11,20-trione | 0.0100 |
| Partially sulfated cetyl and stearyl alcohols | 0.0040 |
| Diethylene glycol stearate | 0.0200 |
| Liquid petrolatum (heavy) | 0.0300 |
| Sodium methyl para-hydroxy benzoate | 0.0015 |
| Glycerol | 0.0500 |
| Distilled water | 0.8245 |
| Isopropanol | 0.0600 |
| Total | 1.0000 |

The partially sulfated cetyl and stearyl alcohols, diethylene glycol stearate and liquid petrolatum were melted and stirred together. The sodium methyl para-hydroxy-benzoate was dissolved in 70% of the warm water. This aqueous solution was added to the melted waxes with thorough stirring to form an emulsion. The 21-azido-1,4-pregnadiene-17α-ol-3,11,20-trione was then milled together with the glycerol and the remainder of the warm water thus forming a thin slurry. The warm slurry was then added to the previously formed emulsion and thoroughly stirred until the temperature of the lotion was about 35° C. At this point, the isopropanol was incorporated by thorough stirring.

*Example 6*

Fifty milliliters of a nutrient medium are prepared having the following composition:

| | | |
|---|---|---|
| Cerelose | grams | 1 |
| Edamin | grams | 1 |
| Corn steep liquor | ml | 0.25 |
| Distilled water to make 50 ml. | | |

This medium is adjusted to pH 6.5 with potassium hydroxide, sterilized and inoculated with about 2.5 to 5 ml. of a culture of *Mycobacterium phlei* (MB 481) ATCC 12,298 microorganisms, and the inoculated culture is then incubated at a temperature of 28° C., with agitation, for a twenty-four hour period. To the resulting culture is added a solution containing 10 mg. of 21-azido pregnane-11β,17α-diol-3,20-dione dissolved in 0.1 ml. of dimethylformamide. The culture containing the steroid compound is incubated, with agitation for an additional period of about 24 hours at 28° C.

The fermentation broth is extracted with three 50 ml. portions of ethyl acetate, and the ethyl acetate extracts are combined and evaporated in vacuo to a volume of about 5 ml. The concentrated solution is then used to prepare streak-paper chromatograms which are developed utilizing formamide as the stationary liquid phase and chloroform as the mobile liquid phase. The paper chromatogram is dried, and the band corresponding to the component which shows an ultra-violet adsorption maximum at almost 245 mu is cut off and extracted with methanol. The material extracted with methanol is again subjected to streak-paper chromatography, using paper which has been extracted for 48 hours with methanol, and employing the chloroform-formamide system previously employed. The paper chromatogram is thoroughly dried, and the band corresponding to the 245 mu adsorption maximum is cut off and extracted with methanol. The methanol extract is evaporated to dryness in vacuo to give 21-azido-1,4-pregnadiene-11β,17α-diol-3,20-dione.

In the same manner following the procedure above 21-azido-allopregnane-11β,17α-diol-3,20-dione is converted to 21-azido-1,4-pregnadiene-11β,17α-diol-3,20-dione.

Any departure from the above description which conforms to the present invention is intended to be included within the scope of the claims.

We claim:

1. A compound selected from the group consisting of compounds having the formula

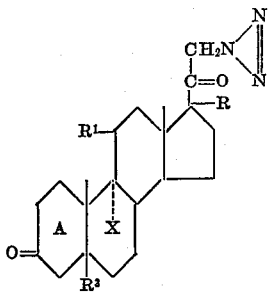

wherein R is selected from the group consisting of hydrogen and hydroxy, $R^1$ is selected from the group consisting of keto and hydroxy, $R^3$ is selected from the group consisting of β-H and α-H and X is selected from the group consisting of hydrogen, chloro, bromo and fluoro groups, and derivatives thereof having in the A ring a double bond in conjugation with the 3-keto substituent.

2. 21-azido pregnane-3,20-dione having at the 11-position a member of the class consisting of hydroxy and keto substituents.

3. 21-azido-pregnan-17α-ol-3,20-dione having at the 11-position a member of the class consisting of hydroxy and keto substituents.

4. 21-azido-4-pregnene-3,20-dione having at the 11-position a member of the class consisting of hydroxy and keto substituents.

5. 21-azido-4-pregnen-17α-ol-3,20-dione having at the 11-position a member of the class consisting of hydroxy and keto substituents.

6. 21-azido-1,4-pregnadiene-3,20-dione having at the 11-position a member of the class consisting of hydroxy and keto substituents.

7. 21-azido-1,4-pregnadien-17α-ol-3,20-dione having at the 11-position a member of the class consisting of hydroxy and keto substituents.

8. 21-azido-allopregnane-3,20-dione having at the 11-position a member of the class consisting of hydroxy and keto substituents.

9. 21-azido-allopregnan-17α-ol-3,20-dione having at the 11-position a member of the class consisting of hydroxy and keto substituents.

10. 21-azido-4-pregnen-17α-ol-3,11,20-trione.

11. 21-azido-4-pregnene-11β,17α-diol-3,20-dione.

12. 21-azido-1,4-pregnadien-17α-ol-3,11,20-trione.

13. 21-azido-1,4-pregnadiene-11β,17α-diol-3,20-dione.

14. 21 - azido - 9α - fluoro - 1,4 - pregnadiene - 11β,17α-diol-3,20-dione.

15. A process which comprises reacting a compound selected from the group consisting of compounds having the formula

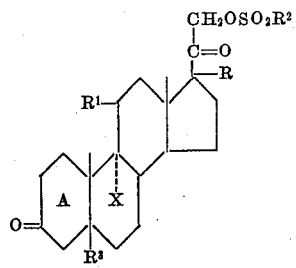

wherein R is selected from the group consisting of hydrogen and hydroxy, $R^1$ is selected from the group consisting of keto and hydroxy, $R^2$ is an alkyl group containing less than seven carbon atoms, $R^3$ is selected from the group consisting of β-H and α-H, and X is selected from the group consisting of hydrogen, chloro, bromo and fluoro groups, and derivatives thereof having in the A ring a double bond in conjugation with the 3-keto substituent, with a compound selected from the group consisting of alkali metal and alkaline earth metal azides to produce the corresponding 21-azido compound.

16. The process of claim 15, wherein the azide is sodium azide.

17. The process of claim 15, wherein the reaction is carried out in an organic solvent.

18. The process of claim 17, wherein the reaction is carried out at the reflux temperature of the reaction mixture.

19. The process of claim 18, wherein the reaction is carried out for a period of from one to four hours.

20. A process which comprises reacting 21-mesylate-4-pregnene-17α,ol-3,11,20-trione with sodium azide to produce 21-azido-4-pregnene-17α-ol-3,11,20-trione.

21. A process which comprises reacting 21-mesylate-4-pregnene-11β,17α-diol-3,20-dione with sodium azide to produce 21-azido-4-pregnene-11β,17α-diol-3,20-dione.

22. A process which comprises reacting 21-mesylate-1,4-pregnadiene-17α,ol-3,11,20-trione with sodium azide to produce 21-azido-1,4-pregnadiene-17α,ol-3,11,20-trione.

23. A process which comprises reacting 21-mesylate-1,4 - pregnadiene - 11β,17α - diol - 3,20 - dione with sodium azide to produce 21-azido-1,4-pregnadiene-11β,17α-diol-3,20-trione.

24. A process which comprises reacting 21-mesylate-9α - fluoro - 1,4 - pregnadiene - 11β,17α - diol - 3,20-dione with sodium azide to produce 21-azido-9α-fluoro-1,4-pregnadiene-11β,17α-diol-3,20-trione.

References Cited in the file of this patent

UNITED STATES PATENTS

| | | |
|---|---|---|
| 2,248,284 | Reichstein | July 8, 1941 |
| 2,254,562 | Bockmuhl | Sept. 2, 1941 |
| 2,492,188 | Sarett | Dec. 27, 1949 |